March 9, 1965 R. C. CRUZAN 3,173,040
ELECTROMOTIVE LINEAR ACTUATOR
Filed Nov. 19, 1962
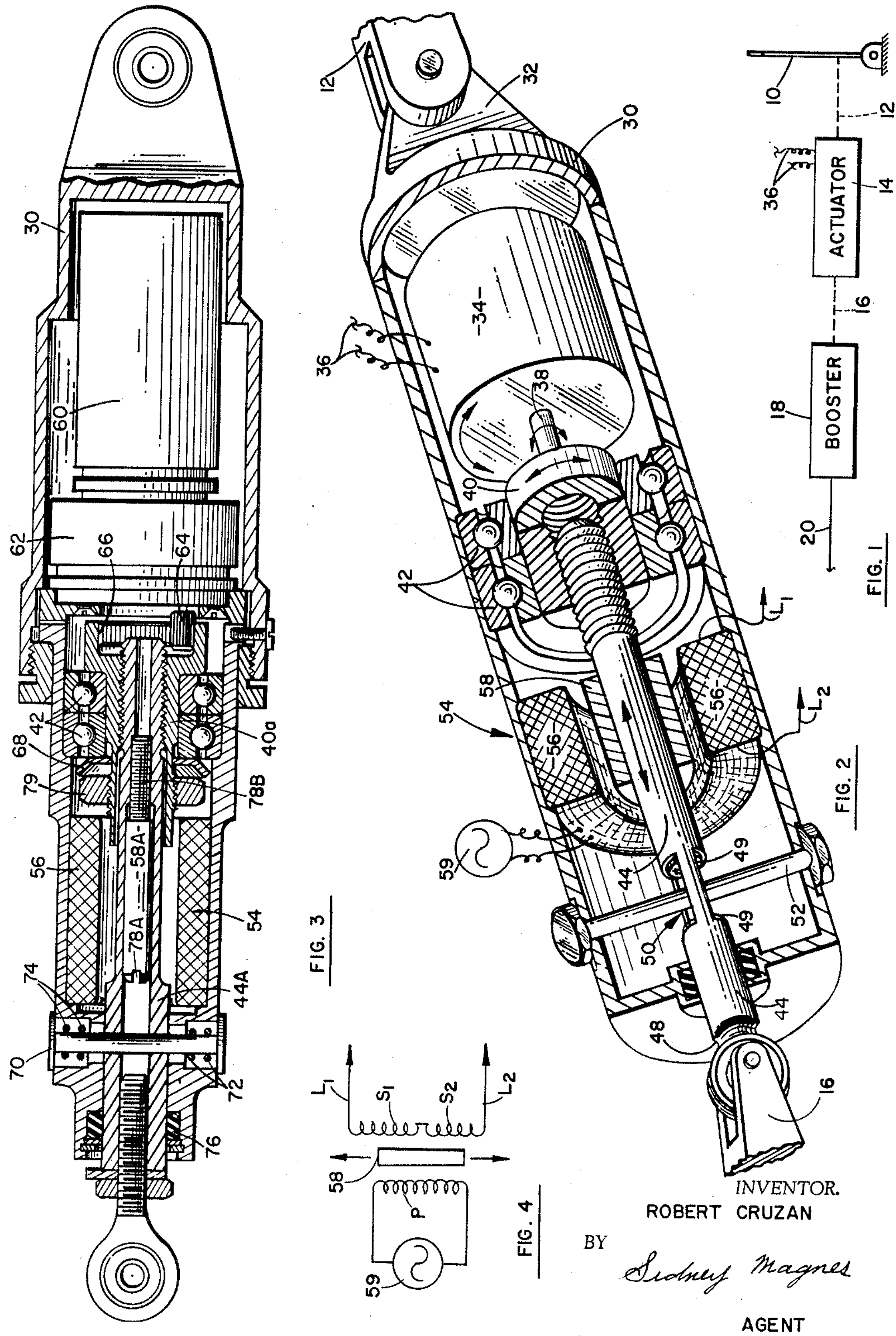
INVENTOR.
ROBERT CRUZAN
BY Sidney Magnes
AGENT 3,173,040
ELECTROMOTIVE LINEAR ACTUATOR
Robert C. Cruzan, La Habra, Calif., assignor to North American Aviation, Inc.
Filed Nov. 19, 1962, Ser. No. 238,418
7 Claims. (Cl. 310—83)

This invention relates to an actuator; and more particularly to an actuator comprising a device the overall length of which may be selectively controlled by electrical signals.

In many control systems it is desirable that an element be lengthened or shortened by a pressure device in response to electrical signals. A pressure device is called a "booster" and the extensible element is called an "actuator." In some cases a change in length may control the settings of valves which permit a hydraulic fluid or air pressure to displace various portions of a structure. In other cases, the change in length of the actuator may physically move selected elements.

Control systems having boosters and actuators are widely used in airplanes, helicopters, submarines, boats of the hydrafoil type, etc., to vary the position or the angle of various control elements, such as rotor blades, rudders and the like. The invention is described herein with reference to its use on a helicopter; however, this is not to be construed as a limitation to its use.

Helicopters have a large assortment of controls including a throttle control, a tail-rotor control, a collective-pitch control that causes the helicopter to rise or descend, a cyclic-pitch control that determines the horizontal direction of movement of the helicopter, and a roll-control that prevents the helicopter from rolling. The operation of a helicopter is such that all of these controls tend to interact with each other; and the operator is therefore constantly making minor compensating adjustments to each of the controls.

It is therefore a principal object of the invention to provide an improved control system to reduce the work of the system operator.

The attainment of this object and others will be realized from the following specification, taken in conjunction with the drawings of which FIG. 1 shows a simplified, block diagram of a control system of a helicopter;

FIG. 2 shows a cut-away diagrammatic representation of the basic concept of the invention;

FIG. 3 shows a cross-sectional view of another embodiment of the invention; and

FIG. 4 shows a circuit diagram of a transducer employed in the embodiments of FIGS. 2 and 3.

Broadly speaking, the invention contemplates a control system wherein an actuator is mechanically interconnected between the pilot's control stick and the control elements of the helicopter; or between the pilot's control stick and the hydraulic booster that actually positions the control elements of the helicopter.

When the helicopter rolls, rises or descends, or yaws off in the one direction or another, sensing units mounted on the helicopter produce electrical signals that indicate the change in motion or attitude of the helicopter. These sensing signals are applied to an actuator that lengthens or shortens itself, and thus controls the position of one or more specific control elements or hydraulic valves. Thus, an automatic compensation is provided for certain changes of the helicopter's motion, attitude, altitude, etc., without requiring the pilot's attention.

This compensation provided by the control system is preferably limited to a fraction, say, about one-tenth of the control provided by the pilot's control stick. Such a control is said to have "10% authority." This means that it will partially compensate for changes automatically, or compensate fully for minor changes, but may be easily overridden whenever the pilot moves the control stick.

As indicated above, the operation of a helicopter is sensitive and required constant attention on the part of the pilot. In most large helicopters, when the pilot moves his control stick, a mechanical linkage opens or closes valves which permit a high pressure hydraulic fluid to actually move the linkages that control the anges of the rotor blades. This type of system obviates the need for the pilot to physically move the control elements.

Because of mechanical considerations, a small movement of the pilot's control stick produces a relatively large movement of the control elements. Under ordinary conditions this is necessary and desirable, in order that the pilot have adequate control of the helicopter. However, when the helicopter constantly pitches, yaws, rolls, or rises or falls because of air conditions, it becomes extremely tiresome for the pilot to provide the fine stick-movement control necessary to compensate for these conditions.

The utility of the invention may be understood from FIG. 1 which shows a control system wherein a pilot's control stick 10 is connected by a mechanical linkage 12 to an extensible link, or actuator 14. The actuator is connected in turn by a second mechanical linkage 16 to a hydraulic booster 18, the output of which is generally a flow of hydraulic fluid through pipelines such as 20. The hydraulic fluid moves the control elements which actually control the flight of the helicopter. Alternatively, the booster 18 and hydraulic fluid lines 20 may be coupled to the control elements by a mechanical linkage.

Ordinarily, when the pilot moves control stick 10, the combination of mechanical linkages 12 and 16, and the actuator 14, form a connection to the hydraulic booster 18, or to the control elements. When a booster is used, the movement of control stick 10 activates the hydraulic booster 18 to control the desired units of the helicopter.

However, if minor changes take place in the attitude, altitude, or other flight conditions, of the helicopter, the electrical sensing signals applied through wires 36 to actuator 14, cause it to lengthen or shorten. At the same time, the pilot or a friction device may hold the control stick stationary, but the changed length of the combination of elements 12, 14 and 16 affects hydraulic booster 18 in such a way that it automatically compensates for the changes in flight condition that occurred.

The actuator is enclosed in a housing or case 30, that has a connecting lug 32 at one end thereof, as shown in FIG. 2. The linkage 12 is suitably connected to a lug 32. The case 30 contains a reversible motor 34 controllable by signals produced by the previously described sensing units and applied through the wires 36.

The motor shaft 38 is fastened to, and rotates a sleeve or nut 40 having an internal screw thread. The nut 40 is permitted to rotate by any well-known means such as a suitable bearing 42—but is prevented from moving longitudinally.

A rod 44 has one end threaded externally in such a way that it fits into and mates with the internal threads of nut 40. As nut 40 rotates in response to the electrical signals applied to the motor, rod 44 is moved into or out of the nut 40 to cause the distal end 48 of rod 44 connected to the linkage 16 to move backwards or forwards, thereby producing a motion referred to as "translation." Translation of the linkage 16 actuates the hydraulic booster 18.

A slot 50 is provided in the rod 44 in order to establish limits to its translation. A limiting bolt 52 secured to the case 30 fits through the slot 50.

As nut 40 is rotated by the motor responding to incoming signals, it moves or translates rod 44 axially until one of a pair of resilient bumpers 49 mounted on the ends of slot 50 abuts the bolt 52. This abutment stops the rod 44 from moving any further and the motor 34 therefore stalls. Thus, the motion of rod 44 is limited in both directions. The rubber bumpers 49 cushion the stops and protect the nut 40 and rod 44 from damage.

Under some conditions it is desirable to know the position of the movable rod 44. This information may be provided by means of a transducer 54 comprising transformer windings or coils 56 fixedly attached to the case 30 and an armature or core attached to the movable rod 44. The mass of armature 58 is deposed symmetrically about the longitudinal axis of the rod 44.

The operation of the transducer 54 is better understood from FIG. 4 which shows the transformer winding as comprising a primary winding P and two series connected and oppositely wound secondary windings $S_1$ and $S_2$. When the movable armature is in the null position (symmetrically positioned with respect to the two secondary windings $S_1$ and $S_2$), the mutual inductance between each of the secondary windings and the primary winding is the same. Since the secondary windings are wound in series opposition, no output voltage is produced across the output leads $L_1$ and $L_2$ in response to an A.-C. signal from a source 59. If the armature is displaced, the voltage induced in one secondary winding is larger than that induced in the other so that an output voltage is produced of one phase. Motion in the opposite direction produces an output signal of the opposite phase. The amplitude of the output signal is proportional to the displacements. Thus, a signal representing the position of rod 44 is always available and may be used, if desired, as part of a servo-feedback loop to interrupt the flow of electricity to the motor when it is stalled, or to interrupt the operation of the actuator when the helicopter's movement has been properly compensated.

The two secondary windings $S_1$ and $S_2$ are electrically balanced when wound or balanced by external shunt resistors not shown. The transducer as a whole may then be adjusted to produce a zero output signal for the null position of the rod 44 by adjusting the armature to the position which produces a zero output signal for the null position of the rod.

FIG. 3 shows another embodiment of the invention particularly adapted to be used with a high-speed motor that rotates faster than the nut 40 should be rotated. A high-speed motor 60 drives a gear box 62 which rotates a pinion gear 64 that is offset with respect to the center of the case 30. The pinion gear 64 engages the internal teeth of a gear ring 66 that may be either integral with, or affixed to, an internally threaded sleeve or nut 40A that operates as previously described. This gearing permits the use of a motor that is driven at a speed which differs from the desired rotational speed of the nut 40A.

In the embodiment of FIG. 3, the gear ring 66 is prevented from moving to the left by bearing 42 and is prevented from moving to the right by a retaining washer 68 held in place by a locking nut 79.

FIG. 3 shows a somewhat different motion-limiting arrangement. In this embodiment the motion-limiting bolt 70 is affixed to the movable rod 44A; the previously-discussed rubber bumpers are eliminated; and the ends of bolt 70 carry one or more resilient O-rings 72 that fit into recesses 74. In operation, the axial movement of nut 40A and motion-limiting bolt 70 causes the O-rings 72 to bump against the edge of the recess. This bumping stops the motion of the axially-moving rod 44A, stalls the driving motor as previously discussed, and thus eases the shock to the gear box and other components.

It may be desirable that a sealing device 76, which may be a felt ring, be used to prevent particles from entering into the case.

FIG. 3 shows a transducer armature 58A that fits into the hollow portion of rod 44A. Under some purposes, as for nulling the transducer, it may be desirable to adjust the position of transducer armature 58A so that it is centered with respect to the transformer windings when the stop-bolt 70 is centered in recess 74. This may be achieved by means of a threaded bolt-type arrangement whereby rotating armature 58A by means of a slot arrangement 78A causes armature 58A to move longitudinally as threaded portion 78B moves into a mating thread portion. This arrangement permits the position of the armature to be adjusted axially.

It will be noticed that the housing, the motor, the rod, the nut and many of the other components are co-linear. This co-linear arrangement provides symmetrical weight distribution that is advantageous because of its lack of pendulosity. Another advantage is that since the elongated rod moves linearly, instead of the threaded nut, a linear variable differential transducer of the type described with reference to FIG. 4 may be employed by simply disposing the transformer windings around the rod and placing the armature on the rod as shown in FIG. 2 or in the rod as shown in FIG. 3.

When the actuator is exposed to vibration—which is always present in a helicopter—the disclosed actuator tends to remain stable in its position; whereas prior-art actuators having a high pendulosity due to unsymmetrical weight distribution tend to oscillate. The stability of the disclosed actuator minimizes breakage of connecting linkages, provides a steady feeling to the pilot's stick, and increases reliability and length of service of the device.

The disclosed device has another important advantage, in that most of its components are readily-available commercial items that have been well tested and are exceedingly reliable. For example, linear variable differential transformers suitable for use as linear motion transducers are commercially available. This further increases the reliability and usefulness of the disclosed invention.

It may now be realized that the invention has a large number of advantages. It automatically and continually compensates for minor changes in the attitude, or altitude, of the helicopter. Its authority is limited to about 10% of the control exercised by the pilot, and it may be readily overridden whenever the pilot so desires. The rod is supported by bearing surfaces at one end and at the center, and is supported by the threaded nut at the other end. The rotating nut is supported adjacent one end of the rod, thus eliminating binding. Most of the parts are commercially available, yet the actuator contains relatively few parts, and is therefore relatively free from breakage, and thus has a high reliability. The weight of the actuator is symmetrical around its center-line, and is therefore, relatively immune to detrimental effects caused by vibration.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. An actuator comprising
a housing having a central axis;
a motor mounted in said housing with the axis of said motor co-linear with said central axis;
a rod adapted for translational movement along said central axis, said rod having a slot therein and a threaded end, and being mounted co-linearly with said central axis;
an internally-threaded nut engaged with the threaded end of said rod;
a movement-limiting bolt fastened to said housing and traversing said slot of said rod; and
means for causing rotation of said motor to rotate and to cause translation of said rod—whereby movement of said rod causes an end of said slot to abut said movement-limiting bolt.

2. An actuator comprising
a housing having a central axis;

a motor mounted in said housing with the axis of said motor co-linear with said central axis;

a rod adapted for translational movement, said rod having a slot therein and a threaded end, and being mounted co-linearly with said central axis;

an internally threaded nut engaged with the threaded end of said rod;

a movement-limiting bolt fastened to said housing and traversing said slot of said rod; and means, comprising bumpers of resilient material, for cushioning the movement-limiting action.

3. The combination of claim 2 wherein said bumpers comprise resilient material on the ends of said slot.

4. An actuator comprising a housing having a central axis and at least one recess;

a motor mounted in said housing with the axis of said motor co-linear with said central axis;

a rod adapted for translational movement, said rod having a slot therein and a threaded end, and being mounted co-linearly with said central axis;

an internally threaded nut engaged with the threaded end of said rod;

means for coupling said motor to said nut; a movement-limiting bolt fastened to said housing and traversing said slot of said rod; and bumper means, comprising resilient O-rings encircling said movement-limiting bolt, and positioned in said recesses of said housing, for cushioning the movement limiting action.

5. An actuator comprising a housing having a central axis;

a motor mounted in said housing with the axis of said motor co-linear with said central axis;

a rod adapted for translational movement, said rod having a slot therein and a threaded end, and being mounted co-linearly with said central axis;

an internally threaded nut engaged with the threaded end of said rod;

means for coupling said motor to said nut—whereby rotation of said motor causes translational movement of said rod;

a movement-limiting bolt fastened to said housing and traversing said slot of said rod;

means, comprising bumpers of resilient material, for cushioning the movement-limiting action; and transducer means for sensing the position of said rod.

6. The combination of claim 5 wherein said coupling means comprises a rigid connection.

7. The combination of claim 5 wherein said coupling means comprised a gear box.

References Cited by the Examiner

UNITED STATES PATENTS

| | | | |
|---|---|---|---|
| 2,366,739 | 1/45 | McCoy | 310—83 |
| 2,446,393 | 8/48 | Russell | 310—83 |

MILTON O. HIRSHFIELD, *Primary Examiner.*